United States Patent
Kim et al.

(10) Patent No.: US 9,298,717 B2
(45) Date of Patent: Mar. 29, 2016

(54) DATA DEDUPLICATION MANAGEMENT (75) Inventors: Seungil Kim, Seoul (KR); Youngil Ko, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 74 days.

(21) Appl. No.: 13/701,370

(22) PCT Filed: Jun. 14, 2012

(86) PCT No.: PCT/US2012/042456
§ 371 (c)(1),
(2), (4) Date: Nov. 30, 2012

(87) PCT Pub. No.: WO2013/187901
PCT Pub. Date: Dec. 19, 2013

(65) Prior Publication Data
US 2013/0339317 A1    Dec. 19, 2013

(51) Int. Cl.
*G06F 17/30* (2006.01)
(52) U.S. Cl.
CPC .... *G06F 17/30117* (2013.01); *G06F 17/30156* (2013.01)
(58) Field of Classification Search
CPC .................. G06F 11/1453; G06F 17/30117
USPC ........................................................ 707/692
See application file for complete search history.

(56) References Cited

U.S. PATENT DOCUMENTS

| | | | |
|---|---|---|---|
| 2004/0210575 A1 | 10/2004 | Bean et al. | |
| 2006/0279628 A1* | 12/2006 | Fleming | 348/143 |
| 2008/0032739 A1* | 2/2008 | Hoodbhoy et al. | 455/556.2 |
| 2009/0303160 A1 | 12/2009 | Chew et al. | |
| 2010/0166321 A1 | 7/2010 | Sawant et al. | |
| 2010/0332454 A1 | 12/2010 | Prahlad et al. | |
| 2011/0138144 A1* | 6/2011 | Tamura et al. | 711/166 |
| 2011/0225129 A1 | 9/2011 | Agrawal | |
| 2011/0246431 A1* | 10/2011 | Iitsuka | 707/692 |
| 2012/0059800 A1* | 3/2012 | Guo | 707/664 |
| 2012/0110045 A1* | 5/2012 | Takaoka et al. | 707/827 |
| 2012/0141023 A1* | 6/2012 | Wang et al. | 382/162 |
| 2013/0018845 A1* | 1/2013 | Macaskill et al. | 707/634 |

OTHER PUBLICATIONS

International Search Report and Written Opinion from International Application No. PCT/US12/42456 mailed Jun. 14, 2012.
"Tarsnap Efficiency," accessed at http://web.archive.org/web/20120514052339/http://www.tarsnap.com/efficiency.html, accessed on Sep. 12, 2014, p. 1.

* cited by examiner

*Primary Examiner* — Rehana Perveen
*Assistant Examiner* — Alexander Khong
(74) *Attorney, Agent, or Firm* — Brundidge & Stanger, P.C.

(57) ABSTRACT

Technologies are generally described for a data deduplication management scheme for media files uploaded or to be uploaded to a server. In some examples, a method may include identifying, by a server, a creation time of a media file based at least in part on metadata of the media file; identifying, by the server, an uploading time of the media file; calculating, by the server, a difference between the creation time and the uploading time; and performing, by the server, a data deduplication process when the difference is greater than a predetermined value.

22 Claims, 5 Drawing Sheets

DATA DEDUPLICATION MANAGEMENT

CROSS-REFERENCE TO RELATED APPLICATION

This application is the National Stage filing under 35 U.S.C. §371 of PCT application Ser. No. PCT/US2012/42456, filed on Jun. 14, 2012.

BACKGROUND

Data deduplication is a data compression technique for eliminating redundant data. In a typical deduplication process, first data is compared to stored data to detect duplicates, that is, to identify or determine whether the first data is unique or not. Then, when the first data is identified as not being unique, the redundant first data is eliminated and replaced with a small reference that points to the stored data.

SUMMARY

In an example, a method may include identifying, by a server, a creation time of a media file based at least in part on metadata of the media file; identifying, by the server, an uploading time of the media file; calculating, by the server, a difference between the creation time and the uploading time; and performing, by the server, a data deduplication process when the difference is greater than a predetermined value.

In another example, a data deduplication management system may include a creation time identifying unit configured to identify a creation time of a media file, an uploading time identifying unit configured to identify an uploading time of the media file, and a determination unit configured to determine whether it is permissible to perform a data deduplication process for the media file based at least in part on the creation time identified by the creation time identifying unit and the uploading time identified by the uploading time identifying unit.

In yet another example, a computer-readable storage medium may store thereon computer-executable instructions that, in response to execution, cause a data deduplication management system to perform operations, including identifying a creation time of a media file, identifying an uploading time of the media file, and determining whether to perform a data deduplication process for the media file based at least in part on the creation time of the media file and the uploading time of the media file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a data deduplication management scheme for media files uploaded or to be uploaded to a server.

Technologies are generally described for determining whether to perform a data deduplication process for a media file based at least in part on a creation time of the media file and an uploading time of the media file, when a user uploads or tries to upload the media file to a server. The aforementioned creation time of the media file may be provided by, e.g., metadata associated with the media file. By way of example, but not limitation, the metadata of the media file may include data regarding means of creation of the media file, purpose of the media file, time and date of creation of the media file, creator or author of the media file, location where the media file was created, standards used for the media file, etc.

By way of example, but not limitation, the server may include a single server, a collection of servers, a server farm, a server cluster, etc. of a photo sharing service provider and/or a video sharing service provider.

In some examples, the server may identify the creation time of the media file and the uploading time of the media file, and calculate a time difference between the creation time and the uploading time. Then, in some examples, the server may perform the data deduplication process if the time difference is greater than a predetermined value, while otherwise skipping the data deduplication process, on the presumption that if there is no or very little time difference between the creation time and the uploading time, the media file may be considered as unique data not requiring the data deduplication process.

In some examples, the server may identify the creation time of the media file based at least in part on the metadata of the media file. In some examples, when the media file is an image file, the creation time of the media file may be a time when the image file was initially captured. In some examples, when the media file is a video file, the creation time of the media file may be a time when capture of the video file was completed, which may be identified based at least in part on when capture of the video file started and a running time of the video file.

In some examples, the server may identify the uploading time of the media file as a time when the server starts to receive the media file. In some examples, the server may identify the uploading time of the media file as a time when the server receives from a client device a request for uploading the media file.

In some examples, the server may keep or store the identified creation time and/or the identified uploading time.

In some examples, the server may set the predetermined value based at least in part on a processing power and/or a storage capacity thereof.

Figure 1:
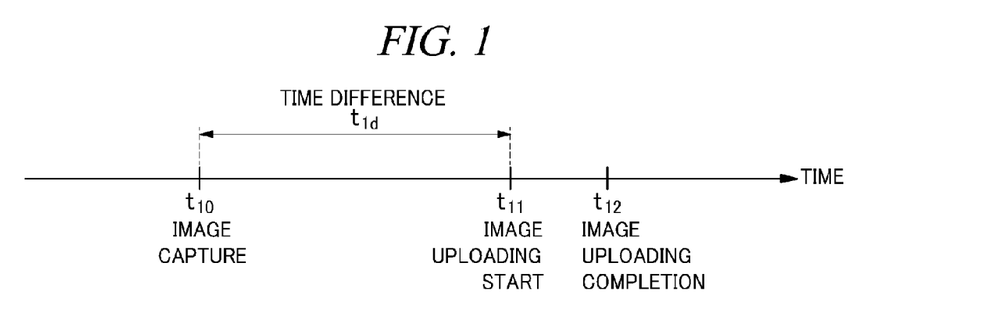
FIG. 1 schematically shows an illustrative example of a timeline related to a process of capturing an image file and uploading the image file to a server, arranged in accordance with at least some embodiments described herein.

FIG. 1 schematically shows an illustrative example of a timeline related to a process of capturing an image file and uploading the image file to a server, arranged in accordance with at least some embodiments described herein.

As depicted in FIG. 1, it may be assumed that a device captures the image file at $t_{10}$ and starts to upload the image file to the server at $t_{11}$, and the uploading of the image file is completed at $t_{12}$. In some embodiments, when the device creates the image file, the device may store $t_{10}$ as metadata of the image file, which may be a portion of the image file. Examples of the device may include, but are not limited to, a smartphone, a mobile phone, a personal digital assistant (PDA), a tablet, a mobile game console, and any other devices that may access to the server via any network. Examples of the server may include, but are not limited to, a single server, a collection of server, a server farm, a server cluster, etc. of a photo sharing service provider such as, for example, Instagram™, Flickr™, Picasa™, etc.

In some embodiments, the server may identify a creation time of the image file as $t_{10}$. In some embodiments, the server may identify the creation time based at least in part on the metadata of the image file.

In some embodiments, the server may identify an uploading time of the image file as $t_{11}$. In some alternative embodiments, the server may identify the uploading time of the image file as a time when the server receives from the device a request for uploading the image file (not shown in FIG. 1).

Then, in some embodiments, the server may calculate a time difference $t_{1d}$ as $t_{11}-t_{10}$, and compare time difference $t_{1d}$ with a predetermined value, to determine whether it is permissible to perform a data deduplication process for the image file.

Figure 2:
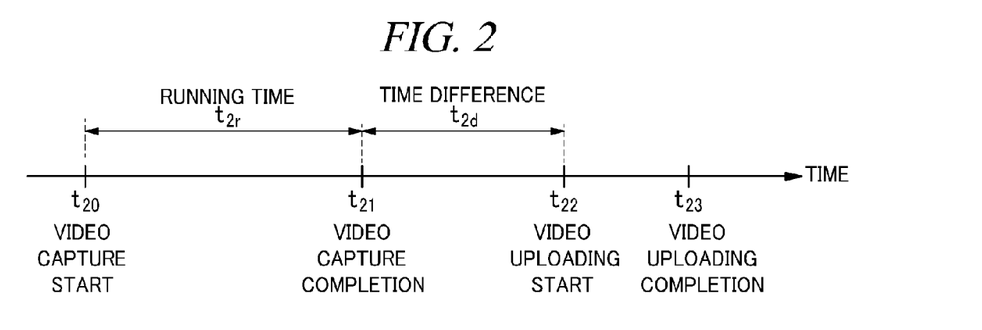
FIG. 2 schematically shows an illustrative example of a timeline related to a process of capturing a video file and uploading the video file to a server, arranged in accordance with at least some embodiments described herein.

FIG. 2 schematically shows an illustrative example of a timeline related to a process of capturing a video file and uploading the video file to a server, arranged in accordance with at least some embodiments described herein.

As depicted in FIG. 2, it may be assumed that a device starts to capture the video file at $t_{20}$, stops capturing of the video file at $t_{21}$, and starts to upload the video file to the server at $t_{22}$, and the uploading of the video file is completed at $t_{23}$. In such cases, a running time $t_{2r}$ of the video file may be $t_{21}-t_{20}$. In some embodiments, when the device creates the video file, the device may store $t_{20}$, $t_{21}$, and/or $t_{2r}$ as metadata of the video file, which may be a portion of the video file. As with the aforementioned image capture, examples of the device may include, but are not limited to, a smartphone, a mobile phone, a personal digital assistant (PDA), a tablet, a mobile game console, and any other devices that may access to the server via any network. Examples of the server may include, but are not limited to, a single server, a collection of server, a server farm, a server cluster, etc. of a video sharing service provider such as, for example, YouTube™, Flickr™, Google™ Video, etc.

In some embodiments, the server may identify a creation time of the video file as $t_{21}$. In some embodiments, the server may identify the creation time by identifying $t_{20}$ and $t_{2r}$ based at least in part on the metadata of the video file, and calculating a sum of $t_{20}$ and $t_{2r}$.

In some embodiments, the server may identify an uploading time of the video file as $t_{22}$. In some alternative embodiments, the server may identify the uploading time of the video file as a time when the server receives from the device a request for uploading the video file (not shown in FIG. 2).

Then, in some embodiments, the server may calculate a time difference $t_{2d}$ as $t_{22}-t_{21}$, and compare time difference $t_{2d}$ with a predetermined value, to determine whether it is permissible to perform a data deduplication process for the video file.

Figure 3:
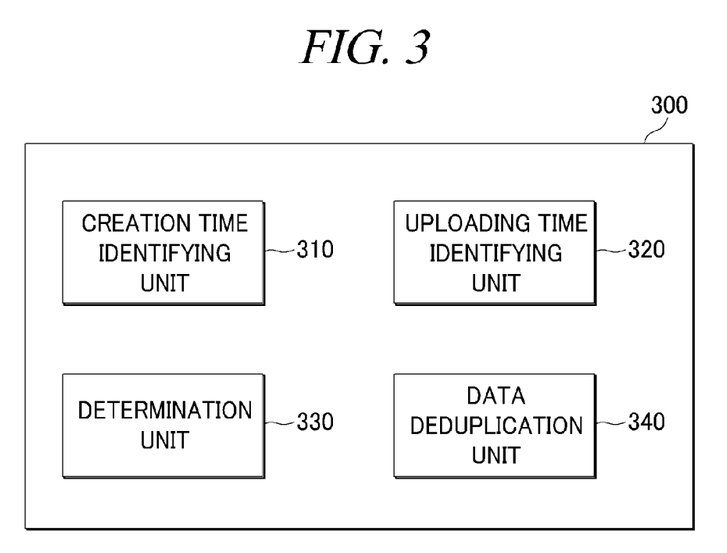
FIG. 3 shows a schematic block diagram illustrating an example architecture of a data deduplication management system for providing a data deduplication management scheme for a server, arranged in accordance with at least some embodiments described herein.

FIG. 3 shows a schematic block diagram illustrating an example architecture of a data deduplication management system for providing a data deduplication management scheme for a server, arranged in accordance with at least some embodiments described herein.

As depicted, a data deduplication management system 300 may include a creation time identifying unit 310, an uploading time identifying unit 320, a determination unit 330 and a data deduplication unit 340. Although illustrated as discrete components, various components may be divided into additional components, combined into fewer components, or eliminated altogether while being contemplated within the scope of the disclosed subject matter. Those skilled in the art will recognize that data deduplication management system 300 may be a component of the server or be separate from but still controlled by the server. Those skilled in the art will also recognize that each component of data deduplication management system 300 may be controlled by one or more segments of a server farm or a server cluster. In such cases, the respective components may be controlled by the same segments or different segments, depending on the desired implementation.

Creation time identifying unit 310 may be configured to identify a creation time of a media file. In some embodiments, creation time identifying unit 310 may be configured to identify the creation time of the media file based at least in part on metadata of the media file, which may include, but are not limited to, data regarding means of creation of the media file, purpose of the media file, time and date of creation of the media file, creator or author of the media file, location where the media file was created, standards used for the media file, etc. That is, creation time identifying unit 310 may be configured to extract the metadata from the media file, analyze the metadata, and identify the creation time of the media file based on the metadata.

In some embodiments, when the media file is an image file, creation time identifying unit 310 may identify the creation time as a time when the image file was initially captured. In some embodiments, when the media file is a video file, creation time identifying unit 310 may identify the creation time as a time when capture of the video file was completed. By way of example, but not limitation, creation time identifying unit 310 may identify the time when capture of the video file was completed based at least in part on when capture of the video file started and a running time of the video file.

Uploading time identifying unit 320 may be configured to identify an uploading time of the media file. In some embodiments, uploading time identifying unit 320 may be configured to identify the uploading time of the media file as a time when the server starts to receive the media file. In some alternative embodiments, uploading time identifying unit 320 may identify the uploading time of the media file as a time when the server receives a request for uploading the media file.

Determination unit 330 may be configured to determine whether it is permissible to perform a data deduplication process for the media file based at least in part on the creation time identified by creation time identifying unit 310 and the uploading time identified by uploading time identifying unit 320. In some embodiments, determination unit 330 may be configured to determine that it is permissible to perform the data deduplication process for the media file when a difference between the creation time and the uploading time is greater than a predetermined value.

In some embodiments, the predetermined value may vary based at least in part on a processing power of the server and/or a storage capacity of the server. By way of example, but not limitation, when the storage capacity of the server is relatively large, and/or the processing power of the server is relatively insufficient, the predetermined value may be set relatively high. Meanwhile, when the storage capacity of the server is relatively insufficient, and/or the processing power of the server is relatively sufficient, the predetermined value may be set relatively low.

Data deduplication unit 340 may be configured to perform the data deduplication process for the media file when determination unit 330 determines that it is permissible to perform the data deduplication process for the media file.

As such, data deduplication management system 300 may reduce the server's analysis overhead for deduplication by skipping the data deduplication process for some media files determined as being unique based at least in part on their creation times and uploading times.

Figure 4:
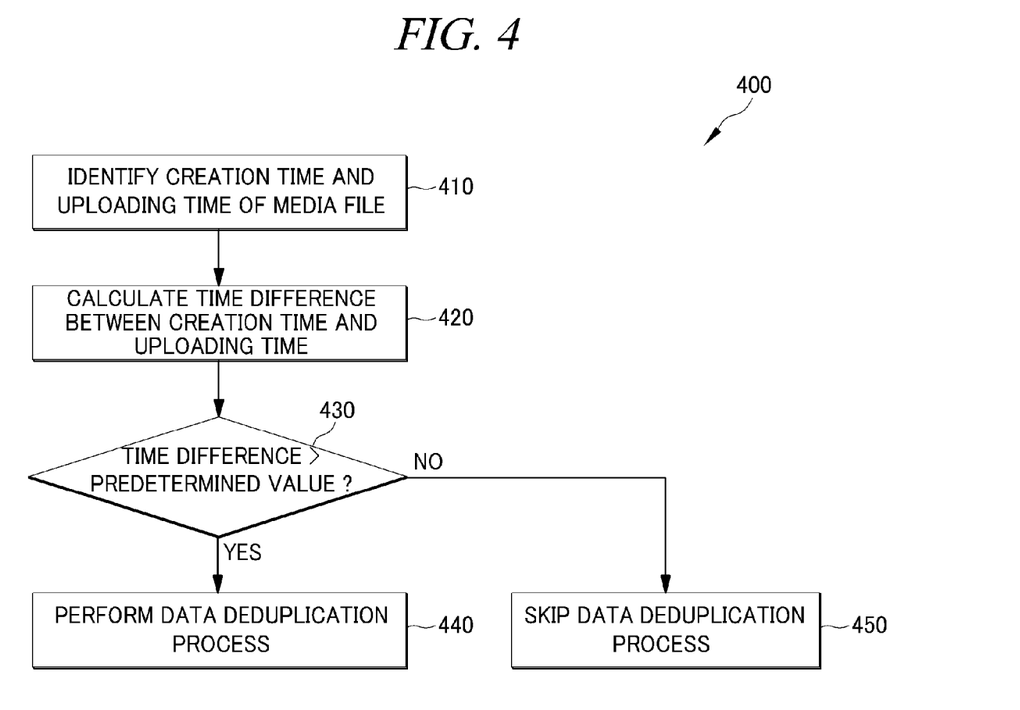
FIG. 4 shows an example flow diagram of a process for providing a data deduplication management scheme for a server, arranged in accordance with at least some embodiments described herein.

FIG. 4 shows an example flow diagram of a process for providing a data deduplication management scheme for a server, arranged in accordance with at least some embodiments described herein.

The process in FIG. 4 may be implemented in a server or a data deduplication management system such as data deduplication management system 300 described above, which may be a component of the server or separate from but controlled by the server. An example process 400 may include one or more operations, actions, or functions as illustrated by one or more blocks 410, 420, 430, 440 and/or 450. Although illustrated as discrete blocks, various blocks may be divided into additional blocks, combined into fewer blocks, or eliminated, depending on the desired implementation. Processing may begin at block 410.

At block 410 (Identify Creation Time and Uploading Time of Media File), the server or the data deduplication management system may identify a creation time and an uploading time of a media file. In some embodiments, the server or the data deduplication management system may identify the creation time of the media file based at least in part on metadata of the media file.

In some embodiments, when the media file is an image file, the server or the data deduplication management system may identify the creation time as a time when the image file was initially captured. In some embodiments, when the media file is a video file, the server or the data deduplication management system may identify the creation time as a time when capture of the video file was completed. By way of example, but not limitation, the server or the data deduplication management system may identify the time when capture of the video file was completed based at least in part on when capture of the video file started and a running time of the video file.

In some embodiments, the server or the data deduplication management system may identify the uploading time of the media file as a time when the server starts to receive the media file. In some alternative embodiments, the server or the data deduplication management system may identify the uploading time of the media file as a time when the server receives a request for uploading the media file. Processing may continue from block 410 to block 420.

At block 420 (Calculate Time Difference between Creation Time and Uploading Time), the server or the data deduplication management system may calculate a time difference between the creation time and the uploading time. Processing may continue from block 420 to block 430.

At block 430 (Time Difference>Predetermined Value?), the server or the data deduplication management system may determine whether the time difference is greater than a predetermined value. In some embodiments, the server or the data deduplication management system may set the predetermined value based at least in part on at least one of a processing power of the server and a storage capacity of the server. When the server or the data deduplication management system determines that the time difference is greater than a predetermined value, processing may continue from block 430 to block 440. Otherwise, processing may continue from block 430 to block 450.

At block 440 (Perform Data Deduplication Process), the server or the data deduplication management system may perform a data deduplication process for the media file. By way of example, but not limitation, the server or the data deduplication management system may compare the media file with other stored data to detect duplicates, and when the media file is identified as not being unique, the server or the data deduplication management system may eliminate the redundant media file.

At block 450 (Skip Data Deduplication Process), the server or the data deduplication management system may skip the data deduplication process for the media file, on the presumption that if the time difference between the creation time and the uploading time is less than the predetermined value, the media file may be considered as unique data not requiring the data deduplication process. The server or the data deduplication management system may store the media file without performing the data deduplication process.

As such, the server's analysis overhead for deduplication may be reduced, by skipping the data deduplication process for some media files determined as being unique based at least in part on their creation times and uploading times.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
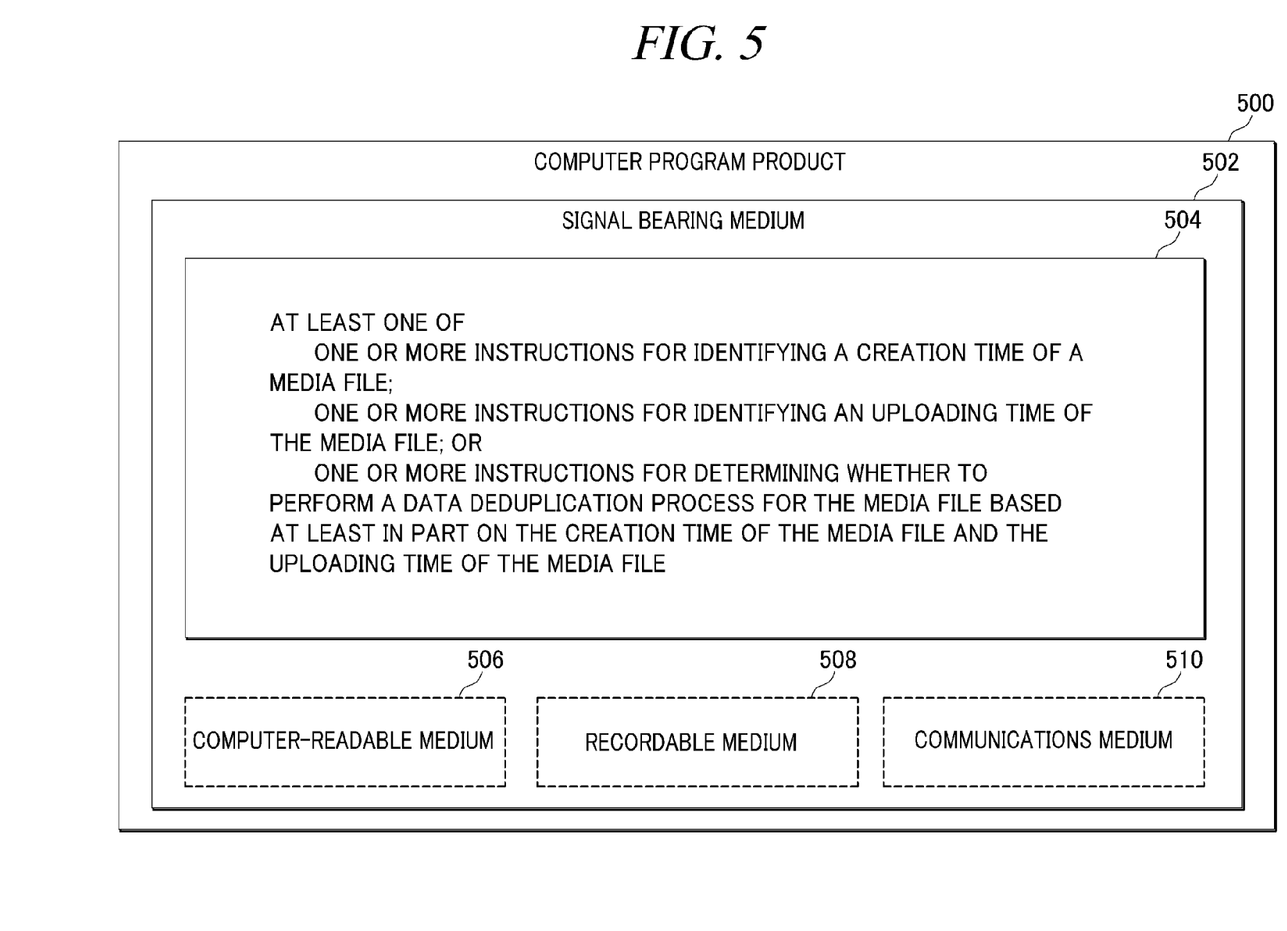
FIG. 5 illustrates an example computer program product that may be utilized to provide a data deduplication management scheme, arranged in accordance with at least some embodiments described herein.

FIG. 5 illustrates an example computer program product that may be utilized to provide a data deduplication management scheme, arranged in accordance with at least some embodiments described herein.

Computer program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for identifying a creation time of a media file; one or more instructions for identifying an uploading time of the media file; or one or more instructions for determining whether to perform a data deduplication process for the media file based at least in part on the creation time of the media file and the uploading time of the media file. Thus, for example, referring to FIG. 3, data deduplication management system 300 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of data deduplication management system 300 by an RF signal bearing medium 502, where the signal bearing medium 502 is conveyed by a wireless communications medium 510 (e.g., a wireless communications medium conforming with the IEEE 802.11 standard).

Figure 6:
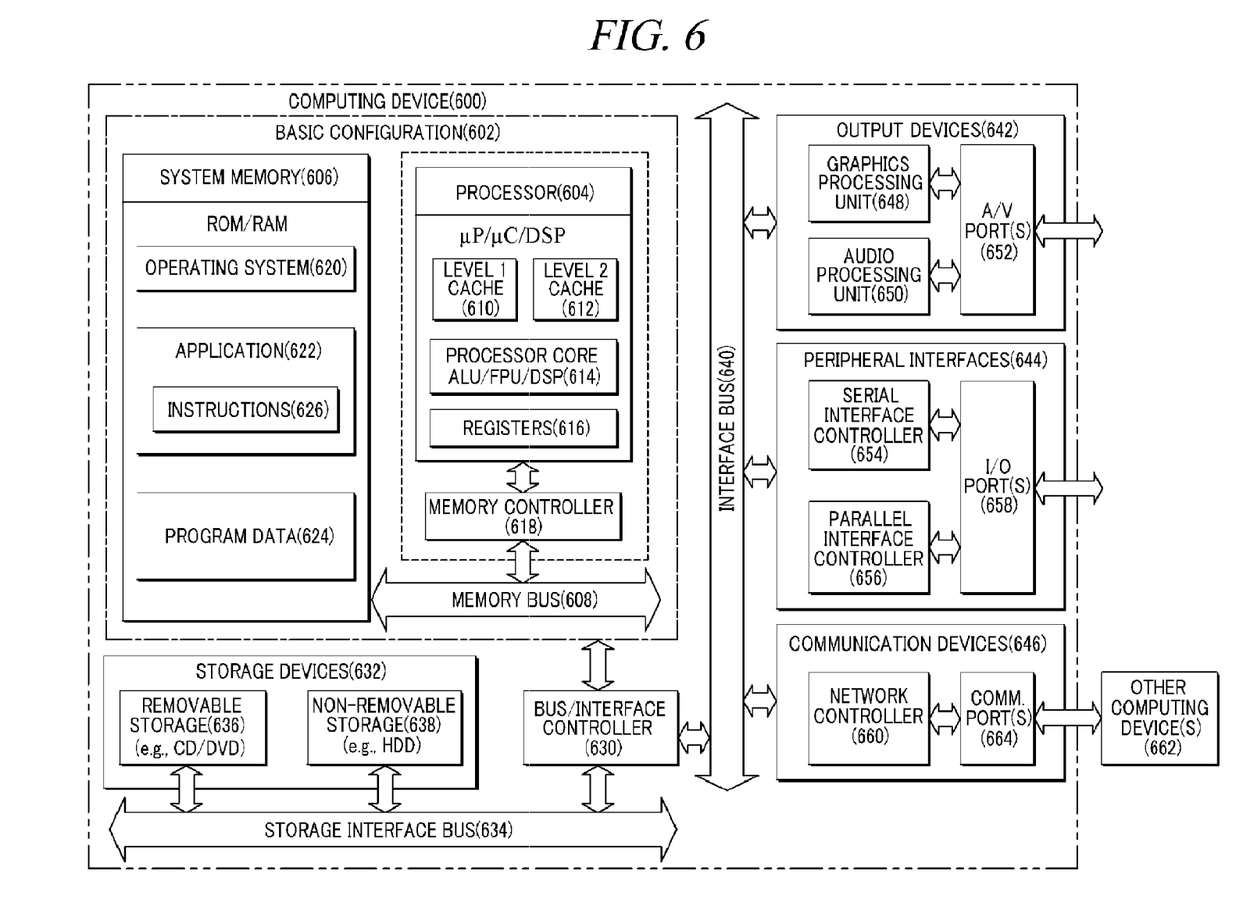
FIG. 6 is a block diagram illustrating an example computing device that may be utilized to provide a data deduplication management scheme, arranged in accordance with at least some embodiments described herein.

FIG. 6 is a block diagram illustrating an example computing device that may be utilized to provide a data deduplication management scheme, arranged in accordance with at least some embodiments described herein.

In these examples, elements of computing device 600 may be arranged or configured for a server. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the data deduplication management system 300 architecture as shown in FIG. 3 or including the actions described with respect to the flow charts shown in FIG. 4. In some examples, application 622 may be arranged to operate with program data 624 on an operating system 620 such that implementations for instructions for an electronic device as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
   identifying, by a server, a creation time of a media file based at least in part on metadata extracted from the media file;
   identifying, by the server, an uploading time of the media file to the server;
   calculating, by the server, a difference between the creation time and the uploading time;
   determining whether the media file is unique or not unique based on the creation time and the uploading time; and
   performing, by the server, a data deduplication process when the media file is determined to be not unique as a result of the determining;
   wherein the media file is determined to be not unique when the difference between the uploading time and the creation time is greater than a predetermined value; and wherein the uploading time of the media file is a time when the server starts to receive the media file.

2. The method of claim 1, wherein the media file is an image file, and the creation time of the media file is a time when the image file was initially made.

3. The method of claim 1, wherein the media file is a video file, and the creation time of the media file is a time when capture of the video file was completed.

4. The method of claim 1, wherein the media file is a video file, and
wherein the identifying of the creation time of the media file is based at least in part on when capture of the video file started and a running time of the video file.

5. The method of claim 1, wherein the uploading time of the media file is a time when the server receives from a client device a request for uploading the media file.

6. The method of claim 1, wherein the predetermined value is set by the server based at least in part on at least one of a processing power of the server and a storage capacity of the server.

7. The method of claim 1, wherein the server stores at least one of the creation time and the uploading time.

8. A data deduplication management computing system, comprising:
a processor; and
a memory coupled to the processor, the memory storing:
a creation time identifying unit configured to identify a creation time of a media file based at least in part on metadata extracted from the media file;
an uploading time identifying unit configured to identify an uploading time of the media file to the data deduplication management computing system;
a determination unit configured to determine whether the media file is unique or not unique based on the creation time and the uploading time; and
a data deduplication unit configured to perform a data deduplication process for the media file in response to the determination unit determining that the media file is not unique;
wherein the media file is determined to be not unique when the difference between the creation time identified by the creation time identifying unit and the uploading time identified by the uploading time identifying unit is greater than a predetermined value; and
wherein the uploading time of the media file is a time when the data deduplication management computing system starts to receive the media file.

9. The data deduplication management computing system of claim 8, wherein the predetermined value is set by a server based at least in part on at least one of a processing power of the server and a storage capacity of the server.

10. The data deduplication management computing system of claim 8, wherein the media file is an image file and the creation time of the media file is a time when the image file was initially captured.

11. The data deduplication management computing system of claim 8, wherein the media file is a video file and the creation time of the media file is a time when capture of the video file was completed.

12. The data deduplication management computing system of claim 8, wherein the media file is a video file, and
wherein the creation time identifying unit is further configured to identify the capture time of the media file based at least in part on when capture of the video file started and a running time of the video file.

13. The data deduplication management computing system of claim 8, wherein the uploading time of the media file is a time when a server receives from a client device a request for uploading the media file.

14. A non-transitory computer-readable storage medium having stored thereon computer-executable instructions that, if executed, cause a data deduplication management computing system to perform operations comprising:
identifying a creation time of a media file based at least in part on metadata extracted from the media file;
identifying an uploading time of the media file to the data deduplication management computing system;
determining whether the media file is unique or not unique based on the creation time and the uploading time; and
performing the data deduplication process for the media file when the difference between the creation time of the media file and the uploading time of the media file is greater than a predetermined value;
wherein the uploading time of the media file is a time when the data deduplication management computing system starts to receive the media file.

15. The method of claim 1, wherein the uploading time of the media file is subsequent to the creation time of the media file.

16. The method of claim 1, further comprising:
storing the uploaded media file on the server contemporaneously with the uploading time.

17. The method of claim 1,
wherein the creation time of the media file is prior to uploading the created media file to the server; and
wherein the uploading time of the media file is a time of uploading the created media file to the server.

18. The data deduplication management computing system of claim 8, wherein the uploading time of the media file is subsequent to the creation time of the media file.

19. The data deduplication management computing system of claim 8,
wherein the creation time of the media file is prior to uploading the created media file to the data deduplication management computing system; and
wherein the uploading time of the media file is a time of uploading the created media file to the data deduplication management computing system.

20. The non-transitory computer-readable storage medium of claim 14, wherein the uploading time of the media file is subsequent to the creation time of the media file.

21. The non-transitory computer-readable storage medium of claim 14, wherein the operations further comprise:
storing the uploaded media file on the data deduplication management computing system contemporaneously with the uploading time.

22. The non-transitory computer-readable storage medium of claim 14,
wherein the creation time of the media file is prior to uploading the created media file to the data deduplication management computing system; and
wherein the uploading time of the media file is a time of uploading the created media file to the data deduplication management system.

* * * * *